United States Patent [19]

Pontius

[11] Patent Number: 4,793,837

[45] Date of Patent: Dec. 27, 1988

[54] GASEOUS FILTER CONSTRUCTION

[75] Inventor: Jeffrey S. Pontius, Amanda, Ohio

[73] Assignee: Columbus Industries, Inc., Ashville, Ohio

[21] Appl. No.: 144,130

[22] Filed: Jan. 15, 1988

[51] Int. Cl.$^4$ .............................................. B01D 50/00
[52] U.S. Cl. ....................................... 55/316; 55/524; 55/389; 427/244; 427/365; 427/372.2; 428/281; 428/408; 502/60; 502/413; 502/401
[58] Field of Search .......................... 55/316, 387–389, 55/524; 502/417, 64, 60, 69, 413, 401; 427/244, 365, 372.2; 428/281, 408

[56] References Cited

U.S. PATENT DOCUMENTS 3,019,127  1/1962  Czerwonka et al. ................. 55/524

FOREIGN PATENT DOCUMENTS 146421  9/1983  Japan ...................................... 55/389

Primary Examiner—Bernard Nozick
Attorney, Agent, or Firm—Francis T. Kremblas, Jr.

[57] ABSTRACT

An improved filter pad particularly useful to remove offensive pet odors emanating from animal crates and in aquariums is disclosed. The filter pad includes a base formed of unwoven, randomly oriented synthetic fibers impregnated with a mixture of zeolite particles and activated carbon particles effective to substantially reduce gaseous components having an offensive odor and discoloring agents in aquarium applications.

5 Claims, No Drawings

GASEOUS FILTER CONSTRUCTION

BACKGROUND

Various kinds of filter constructions have been long used for removal of offensive odors. One of the long used filters employ activated carbon in conjunction with a particulate filter media and has enjoyed a limited degree of success for odor reduction in certain applications.

In particular applications, such as filters used in connection with enclosed litter boxes for cats a filter media pad has been used employing zeolite to attempt to more effectively remove pet odors emanating from the litter box. Zeolite is naturally occuring minerals also known by a variety of names including chabazite and clinoptilolite for example. However, this mineral is known to have particular effectiveness in adsorbing gaseous ammonia compounds, such as associated with urine odors, and therefore is helpful to use in such applications such as pet litter boxes or in aquariums.

Prior to the present invention a highly efficient yet relatively inexpensive filter for such pet applications has not been proposed or developed by the trade.

SUMMARY OF INVENTION

The present invention relates generally to filters and particularly to a novel filter construction adapted for use in pet litter crates or aquariums for removal of gaseous components. The novel filter of the present invention employs an non-woven randomly oriented synthetic fiber pad impregnated with a mixture of zeolite and and activated carbon particles to achieve significantly improve removal of gases in an improved, economical manner utilizing a single layer pad.

The unique zeolite and activated carbon combination provides a filter which is very effective to remove those gaseous components normally associated with offensive pet odors, including the ammonia and ammonia compounds associated with urine odor. The particles of zeolite and activated carbon having a particular range of sizes may be mixed together in a water base to which a conventional binder material is added to form a temporary suspension of the zeolite and carbon and applied to the base pad in a single step.

Alternatively, a suspension of either ingredient may be impregnated in two separate steps to achieve an even greater loading of the zeolite in the pad for particular applications.

The addition of zeolite particles to the impregnated pad provides significant improvement in the removal of the odors generated by pet urine since ammonia and certain ammonia compounds are readily removed via a combination of ion exchange at low concentrations and adsorption at high concentrations.

In accordance with the present invention, a single filter pad of randomly oriented synthetic fibers is provided with the dual adsorption capabilities of both activated carbon and zeolite.

The filter pad containing the combinations of these two adsorption media at various concentrations in accordance with the present invention can exhibit excellent ammonia removal characteristics much higher than required by a modified NIOSH test standard.

Further, filter pads constructed in accordance with the present invention achieve excellent odor removal and in aquarium applications, further exhibit de-colorization characteristics to remove color agents created during normal operation of the aquarium.

DETAILED DESCRIPTION

In accordance with the present invention, a combination of zeolite particles and activated carbon particles are simultaneously introduced into a base filter pad comprising a plurality of randomly oriented, non-woven synthetic fibers. Typically, such fibers consist of a polyester material, well known in the filter industry.

Prior to the present invention, such pads have been conventionally impregnated with either activated carbon particles or with zeolite particles, however, none have been impregnated with a combination of such materials uniformly distributed throughout the base pad.

The prior filter pads exhibited good characteristics related to odor removal however, they were limited to those gaseous contaminants to which each had the capability to adsorb. While activated charcoal has a relatively broader range of gaseous compounds which can be effectively adsorbed therein, zeolites are well known for their particularly excellent ability to adsorb ammonia and ammonia compounds.

In certain applications wherein a combination of components are involved and contribute to offensive odors, the prior art filter media, impregnated with only one of activated carbon or zeolite, failed to efficiently remove the offensive odors produced.

As an example, enclosed pet litter boxes or crates such as used with cats, involved a variety of offensive pet odors which include the strong ammonia odor associated with urine. While a zeolite impregnated filter pad is excellent to remove the odor associated with ammonia products, the other odors emanating from pet litter boxes are not removed satisfactorily. An activated carbon impregnated pad fails to remove the ammonia odors as well as the zeolite pad, yet is efficient to remove other pet odors.

In such pet applications, cost is of particular significance for practical commercial use of such filter pads since the pads must be replaced on a regular bases to maintain effectiveness.

Therefore, prior to the present invention, a filter pad impregnated with only activated carbon or with zeolite has been employed in such pet applications and cost generally prohibited use of two such pads at the same time. Additionally, it was not regarded as feasible to impregnate a single filter pad layer with both types of adsorbants and maintain the efficiency of both to obtain practical usefulness.

According to the present invention, it has been found that a mixture of zeolite particles and activated carbon particles may be formed in which a slurry of said particles can be maintained to enable the mixture to be impregnated into a fiber base pad to uniformly distribute the particles of both the zeolite and carbon uniformly throughout the pad.

The impregnation of such a mixture to achieve relatively uniform distribution of both types of particles throughout the base filter pad is very important to achieve the required efficiency of odor removal.

It has also been discovered that the particle size of both the activated carbon and zeolite must be carefully matched relative to one another in order to prepare a slurry which results in a relatively uniform distribution of the particles of activated carbon and zeolite. If the particles of these components are not evenly distributed throughout the base pad, the effectiveness of the pad in removing the noxious odors is significantly impaired.

Further, it has been discovered that greater loading of the fiber pad can be achieved by preparing separate slurries of activated carbon and zeolite and then impregnated the base pad with each slurry in separate impregnation steps and still maintain sufficient uniform distribution of the particles throughout the fiber base pad. The ability to achieve greater levels of one or the other of the adsorbant materials, particularly the zeolite, is very useful in the pet and acquarium applications referred to herein.

The basic process for impregnating the base filter is similar to that conventionally used to impregnate such a pad with a single adsobant component. Such a process requires the base pad to be dipped or passed through a bath of a slurry containing the adsorbant component. The saturated pad layer is then passed through a pair of opposed rollers which control the amount of the slurry mixture retained by the pad via controlling the pressure applied to the pad as it passed between the rollers. Upon leaving the squeeze rollers, the pad is then dried in a process oven. After drying, the pad can be further processed by being coiled into rolls and/or cut into the final desired shape and size for packaging.

Unlike any prior art process, the same base pad in accordance with the present invention is impregnated with both zeolite and activated carbon particles. In the single step impregnation method, a slurry containing both zeolite and activated carbon particles is prepared by mixing the particles in a water base to which conventional liquid binders are added. The particle size of each of the adsorbant components must be carefully matched to assure that the misture in the slurry remains relatively uniform. If this is not accomplished, a randomly uniform mixture of both components is not likely to be achieved in the impregnated pad and efficiency will be dramatically reduced.

It has been found that the particle size of the zeolite and activated carbon particles should be between approximately 140 to 325 mesh. However, it is preferred to maintain both components in the particle size range closer to 325 mesh for best results and more uniform distribution of each throughout the base pad.

Filter pads constructed in accordance with the present invention have been subjected to two standard testing procedures. The first is the standard carbon tetrachloride absorption rest and the second is the cannister bench test which is the standard use by N10SH and the Bureau of Mines. The filter specimens tested was a filter pad prepared in the manner described herein wherein the zeolite and activated carbon was impregnated in an equal mixture and the add on of this components was 240% by weight based upon the unimpregnated base pad having a uniform thickness and a density of 14 grams per foot.

In the carbon tetrachloride test, the adsorption percentage was 12.5%. In the cannister bench test, the concentration of ammonia passing through the pad did not reach the test target amount of 50 parts per million until 25 minutes had expired. This exceeds the N10SH specified minimum service life of 12 minutes under the test procedure by greater than 200%.

The following example illustrates the manufacture of a filter pad in accordance with the present invention such as used in the tests described above.

EXAMPLE I

A sample filter pad specimen was made by first preparing a mixture containing 28 lbs. of water, 4 lbs. of zeolite, 4 lbs. of 325 mesh activated carbon, 1.87 lbs. of B-15 binder and AR-74 binder; the binders are sold commercially under these designations by Rohm-Hass Corporation.

The water is first added to the mixing tank and then the activated carbon is slowly added with agitation to obtain a uniform suspension. The carbon is conventional coconut shell carbon having a carbon tetrachloride activity rating of 60 percent.

Next the zeolite particles are slowly added to the tank, with agitation, to achieve a uniform suspension thereof in the water/carbon mixture. The zeolite particles had the following size range: 1–2% greater than 100 mesh; 75% less than 100 mesh but greater than 140 mesh; 20% less than 140 mesh but greater than 200 mesh; the balance less than 200 mesh.

The binders noted above are then added with continued agitation to achieve a uniform mixture of the components.

Next the prepared mixture is transferred to a holding vessel where it is continually agitated to maintain the suspension of zeolite and carbon in the liquid. Then the mixture is supplied to a conventional apparatus commonly referred to as a "Padder" which includes a bath tank adjacent to a pair of parallel squeeze rollers. A base pad of polyester material is passed through the bath tank to totally saturate the pad with the prepared mixture and then passed between the squeeze rollers. By specifically setting the pressure applied to the pad as it passes between the rollers, the amount of the mixture retained in the polyester pad can be controlled.

After the wet pad had passed through the rollers, it is then dried in a process oven. Upon drying, the pad is removed for cutting to the final size suitable for the give application.

The weight of the original unimpregnated pad at a uniform thickness was 14 grams per foot.

The amount of zeolite and carbon retained in the impregnated pad was 240 per cent by weight based upon the original unimpregnated polyester pad.

EXAMPLE II

The same type of polyester pad was impregnated with zeolite and activated carbon using a two step impregnation process. Such processing has been discovered to provide a filter pad having a greater amount of the combination of zeolite and carbon particles than the single step process described in Example 1.

First a suspension of activated carbon is prepared in the same manner as described in Example 1 and the binders are added in the same manner. Then this mixture having only activated carbon is transferred to the path tank of the padder machine. The polyester pad is then passed through the liquid having the suspended carbon particles and the squeeze rollers and dried as described in Example I. However, this dried pad impregnated with only activated carbon is then processed again in the identical manner with a mixture prepared having only the zeolite particles suspended therein with the necessary amount of binders. After dipping and passing through the rollers, the pad is again dried. The add-on of the combination of zeolite and activated carbon was 353 percent by weight based upon the weight of the unimpregnated pad in this specimen.

Filter pads made in accordance with the two step impregnation of activated carbon and zeolite and having the greater amounts therein are particularly useful and more effective in removing the undesirable pet odors described herein. In those applications requiring enhanced odor removal efficiency, such pads impregnated with greater amounts of the adsorbent material combinations are sufficiently more effective to justify the increase in cost.

In view of the foregoing description, it should be readily understood that the present invention provides a singular base polyester filter pad containing effective amounts of both zeolite and activated carbon adsorption materials which is significantly improved in odor removal applications compared to prior filter constructions incorporating only a single adsorbent component.

What is claimed is:

1. A filter for pet applications comprising, in combination, a base filter pad formed of a plurality of unwoven synthetic fibers randomly oriented to provide a tortious path for the flow of air through said pad and impregnated with a mixture of particles of zeolite and activated carbon distributed uniformly through said pad in an amount effective to remove a substantial amount of undesirable gaseous components contained in the air flowing through said impregnated pad, wherein approximately 97% of said zeolite particles are within a size range between 100 mesh and 325 mesh and said activated carbon particles have a size of approximately 325 mesh.

2. The filter defined in claim 1 wherein said mixture impregnated into said pad includes zeolite in a range of approximately 30% to 60% by weight and activated carbon in a range of approximately 40 to 70% by weight of the total zeolite and activated carbon.

3. The filter defined in claim 1 wherein the amount of the combination of zeolite particles and activated charcoal particles impregnated in the pad range from approximately 200 and 360 percent based upon the weight of the unimpregnated base filter pad.

4. A method of making a filter pad useful to reduce pet odors comprising the steps of: saturating a base filter pad of unwoven synthetic fibers with a water based liquid suspension containing zeolite particles and activated carbon particles and conventional binders uniformly dispersed in said suspension; passing said pad between a pair of rollers to apply a predetermined amount of pressure on said pad to remove a given amount of said liquid suspension; drying said impregnated pad to substantially remove water contained therein and leave the zeolite and carbon particles uniformly distributed through said pad.

5. A method of making a filter pad useful to reduce pet odors comprising, in combination, the steps of: saturating a base filter pad comprising unwoven, synthetic fibers with a water-based liquid suspension of a binder material and activated carbon particles having a size of approximately 325 mesh; drying said pad to remove the water contained therein; saturating said dried pad with a water-based liquid suspension of a binder material and zeolite particles within a size range of approximately 100 to 325 mesh; drying said pad to remove the water contained therein wherein said pad contains an effective amount of both activated carbon and zeolite particles uniformly distributed throughout said base pad to reduce pet odors.

* * * * *